United States Patent
Sashihara

(10) Patent No.: US 12,536,259 B2
(45) Date of Patent: Jan. 27, 2026

(54) IRIS AUTHENTICATION DEVICE AND IRIS AUTHENTICATION METHOD

(71) Applicant: NEC Corporation, Tokyo (JP)

(72) Inventor: Toshiyuki Sashihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 576 days.

(21) Appl. No.: 17/772,589

(22) PCT Filed: Nov. 5, 2019

(86) PCT No.: PCT/JP2019/043229
§ 371 (c)(1),
(2) Date: Apr. 28, 2022

(87) PCT Pub. No.: WO2021/090354
PCT Pub. Date: May 14, 2021

(65) Prior Publication Data
US 2022/0405367 A1    Dec. 22, 2022

(51) Int. Cl.
*G06V 40/18*    (2022.01)
*G06F 21/32*    (2013.01)
*G06V 10/141*    (2022.01)
*G06V 40/19*    (2022.01)

(52) U.S. Cl.
CPC ............ *G06F 21/32* (2013.01); *G06V 10/141* (2022.01); *G06V 40/19* (2022.01); *G06V 40/197* (2022.01)

(58) Field of Classification Search
CPC .............................. G06V 40/19; G06V 40/197
See application file for complete search history.

(56) References Cited

U.S. PATENT DOCUMENTS

| 2003/0012413 | A1 | 1/2003 | Kusakari et al. |
| 2003/0152252 | A1 | 8/2003 | Kondo et al. |
| 2006/0029262 | A1 | 2/2006 | Fujimatsu et al. |
| 2014/0310803 | A1 | 10/2014 | Irie |
| 2016/0253558 | A1 | 9/2016 | Takamoto et al. |
| 2017/0091548 | A1* | 3/2017 | Agrawal ............ G06V 10/141 |
| 2017/0308690 | A1* | 10/2017 | Tsukamoto ............ G06F 3/013 |

(Continued)

FOREIGN PATENT DOCUMENTS

| CN | 106845445 A | 6/2017 |
| CN | 109241850 A | 1/2019 |

(Continued)

OTHER PUBLICATIONS

Malik, S. —"Visual Touchpad: A Two-handed Gestural Input Device"— ICMI 2004—pp. 1-8 (Year: 2004).*

(Continued)

*Primary Examiner* — Bernard Krasnic

(57) ABSTRACT

An iris authentication device includes: a camera that is installed at a position lower than a line of sight of an authentication target person; lighting that is installed either at a same height as the position of the camera or at a position lower than the camera and that irradiates the authentication target person with light; and an authentication unit that performs authentication of the authentication target person by collating an iris that appears in an image of the authentication target person with a pre-registered iris image, the image of the authentication target person being captured by the camera from lower front while the lighting is irradiating the light.

14 Claims, 8 Drawing Sheets

(56) References Cited

U.S. PATENT DOCUMENTS

| | | | |
|---|---|---|---|
| 2018/0181245 A1* | 6/2018 | Beck | G06F 3/0418 |
| 2019/0019024 A1* | 1/2019 | Zhou | G06V 40/19 |
| 2022/0347559 A1* | 11/2022 | Tsuchiya | A63F 13/837 |

FOREIGN PATENT DOCUMENTS

| | | | | |
|---|---|---|---|---|
| EP | 3506196 A1 | | 7/2019 | |
| JP | 2002-133404 A | | 5/2002 | |
| JP | 2004-030564 A | | 1/2004 | |
| JP | 2004-236134 A | | 8/2004 | |
| JP | 2005-135135 A | | 5/2005 | |
| JP | 2005-157970 A | | 6/2005 | |
| JP | 2007-011667 A | | 1/2007 | |
| JP | 2007-041831 A | | 2/2007 | |
| JP | 2007-319175 A | | 12/2007 | |
| JP | 2008-015884 A | | 1/2008 | |
| JP | 2009-205203 A | | 9/2009 | |
| JP | 2009-211597 A | | 9/2009 | |
| JP | 2010-134735 A | | 6/2010 | |
| JP | 2010267121 A | * | 11/2010 | |
| JP | 5229928 B1 | | 7/2013 | |
| JP | 2014-206932 A | | 10/2014 | |
| JP | 2016-162129 A | | 9/2016 | |
| JP | 2018055325 A | * | 4/2018 | |
| JP | 2019-098024 A | | 6/2019 | |
| WO | 2009/016846 A1 | | 2/2009 | |
| WO | WO-2013073197 A1 | * | 5/2013 | G06F 1/1616 |
| WO | 2016/088415 A1 | | 6/2016 | |
| WO | 2018/000184 A1 | | 1/2018 | |

OTHER PUBLICATIONS

Extended European Search Report for EP Application No. EP19952087.5 dated on Sep. 27, 2022.

JP Office Action for JP Application No. 2021-554431, mailed on Mar. 22, 2023 with English Translation.

EP Office Action for EP Application No. 19952087.5, mailed on Aug. 5, 2024.

JP Office Action for JP Application No. 2023-135876, mailed on May 21, 2024 with English Translation.

International Search Report for PCT Application No. PCT/JP2019/043229, mailed on Dec. 17, 2019.

Ikoma et al., "Installation of iris recognition access control system at Sagawa Express Co., Ltd.", Matsushita Technical Journal, vol. 49, No. 5, pp. 11-15, 2003.

* cited by examiner

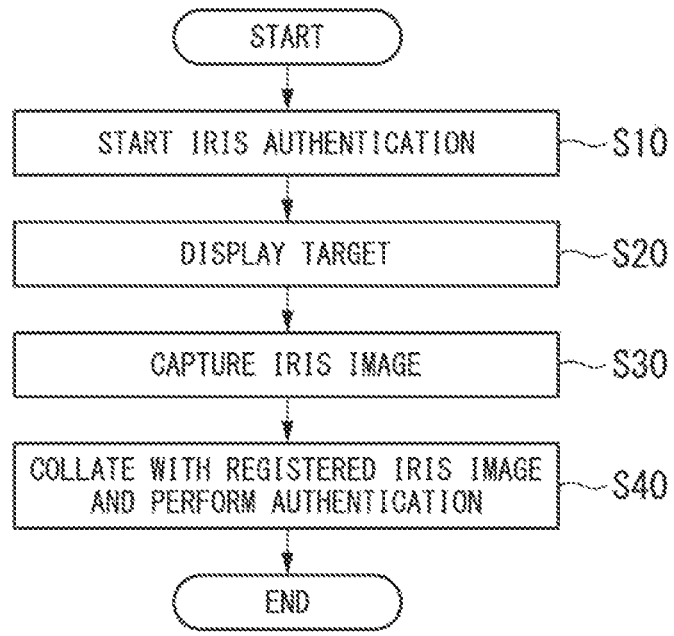
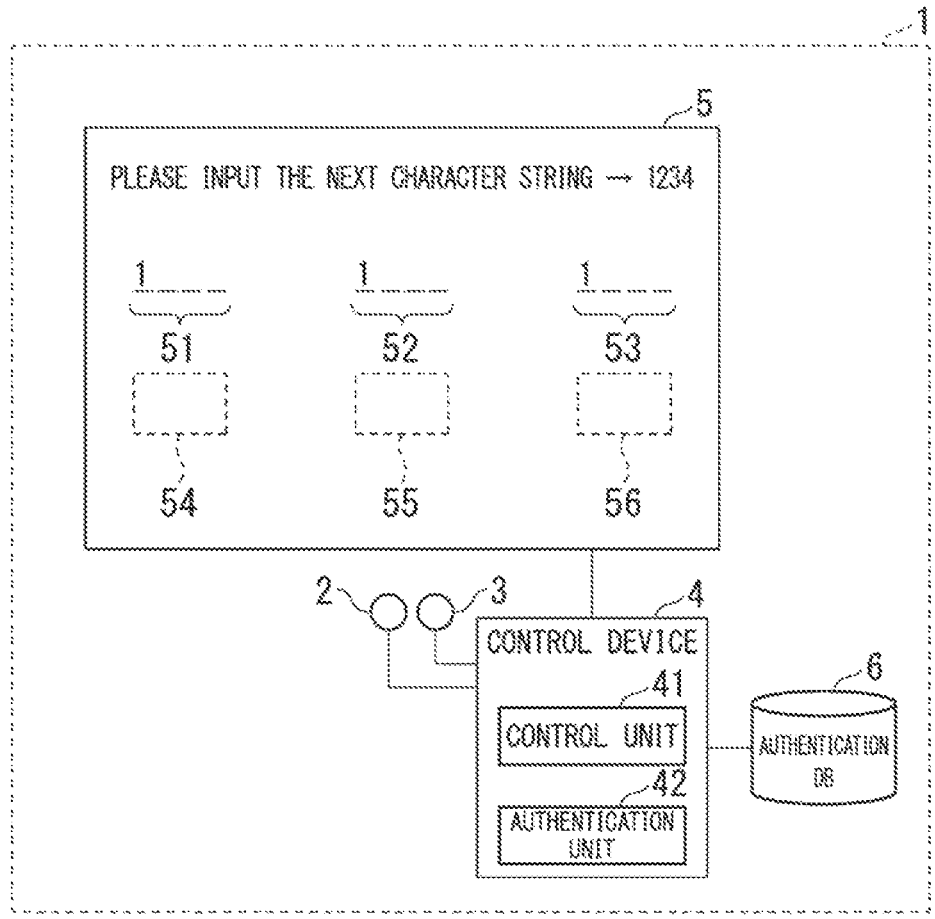

IRIS AUTHENTICATION DEVICE AND IRIS AUTHENTICATION METHOD

This application is a National Stage Entry of PCT/JP2019/043229 filed on Nov. 5, 2019, the contents of all of which are incorporated herein by reference, in their entirety.

TECHNICAL FIELD

This disclosure relates to an iris authentication device and an iris authentication method for promptly capturing an image suitable for iris authentication and performing iris authentication.

BACKGROUND ART

There is an increasing need for biometric authentication as a means of ensuring security without compromising convenience. Among biometric authentication, iris authentication has high authentication accuracy, can be applied to payment processing, and, for example, is expected to be introduced as a means for performing easy and highly accurate personal authentication in stores and the like. In order to quickly perform iris authentication at a store or the like, it is necessary to be able to reliably capture an image of sufficiently high quality (hereinafter referred to as an iris image) to the extent that iris authentication is possible.

Patent Document 1 discloses an iris authentication device in which the positional relationship between the camera and the LED is devised so that the space for iris authentication can be widened while preventing the red-eye phenomenon. Patent Document 2 discloses a technique of using camera capable of capturing an image from a distance to image a walking user from an oblique direction and so perform iris authentication while the user performs a natural motion. Patent Document 3 discloses an imaging device that separately prepares a light source and a camera for each of the left and right eyes of the authentication target person, and guides the position of the eyes quickly and accurately to capture an image for iris authentication.

As a related technique to discriminate whether the subject's eyes are false eyes or eyes of a living body when performing iris authentication, Patent Document 4 discloses a technique of guiding the subject to move his/her line of sight and analyzing an image taken during that period to determine whether or not the subject's eyes are living matter. Patent Document 5 discloses a technique that arranges a left and right pair of cameras with a predetermined interval in the horizontal direction at a position lower than the subject's face, and analyzes an image of the subject's face taken at an elevation angle in the range of 20 to 35 degrees to detect the subject's line of sight.

PRIOR ART DOCUMENTS

Patent Documents

[Patent Document 1] Japanese Unexamined Patent Application, First Publication No. 2016-162129
[Patent Document 2] PCT International Publication No. WO 2009/016846
[Patent Document 3] Japanese Unexamined Patent Application, First Publication No. 2007-319175
[Patent Document 4] Japanese Unexamined Patent Application, First Publication No. 2007-041831
[Patent Document 5] Japanese Unexamined Patent Application, First Publication No. 2019-098024

SUMMARY OF THE INVENTION

Problem to be Solved by the Invention

The iris image is obtained by emitting light from a light source and capturing an image of the eyes of the authentication target person with a camera. If a good quality iris image can be captured by properly arranging the position of the light source and the camera with respect to the position of the eyes of the authentication target person, iris authentication can be performed quickly and the introduction of iris authentication will be promoted. Patent Documents 1 to 5 contain no disclosures concerning the positional relationship between the eyes of the subject to be authenticated, the camera and the light source suited to iris authentication.

This disclosure provides an iris authentication device and an iris authentication method capable of solving the aforementioned problem.

Means for Solving the Problem

According to one example aspect of this disclosure, an iris authentication device includes: a camera that is installed at a position lower than a line of sight of an authentication target person; lighting that is installed either at a same height as the position of the camera or at a position lower than the camera and that irradiates the authentication target person with light; and an authentication unit that performs authentication of the authentication target person by collating an iris that appears in an image of the authentication target person with a pre-registered iris image, the image of the authentication target person being captured by the camera from lower front while the lighting is irradiating the light.

According to one example aspect of this disclosure, an iris authentication method performed by using an iris authentication device including: a camera that is installed at a position lower than a height of a line of sight of an authentication target person; and lighting that is installed either at a same height as the position of the camera or at a position lower than the camera and irradiates the authentication target person with light, includes: performing authentication of the authentication target person by collating an iris that appears in an image of the authentication target person with a pre-registered iris image, the image of the authentication target person being captured by the camera from lower front while the lighting is irradiating the light.

Effect of the Invention

According to the above-mentioned iris authentication device and iris authentication method, it is possible to quickly capture an iris image of a authentication target person having the quality required for the authentication process and perform iris authentication.

BRIEF DESCRIPTION OF THE DRAWINGS

FIG. 5 is a flowchart showing an example of an authentication process according to the first example embodiment of this disclosure.

FIG. 6 is a diagram showing an example of line of sight guidance according to the first example embodiment of this disclosure.

EXAMPLE EMBODIMENT

Figure 1:
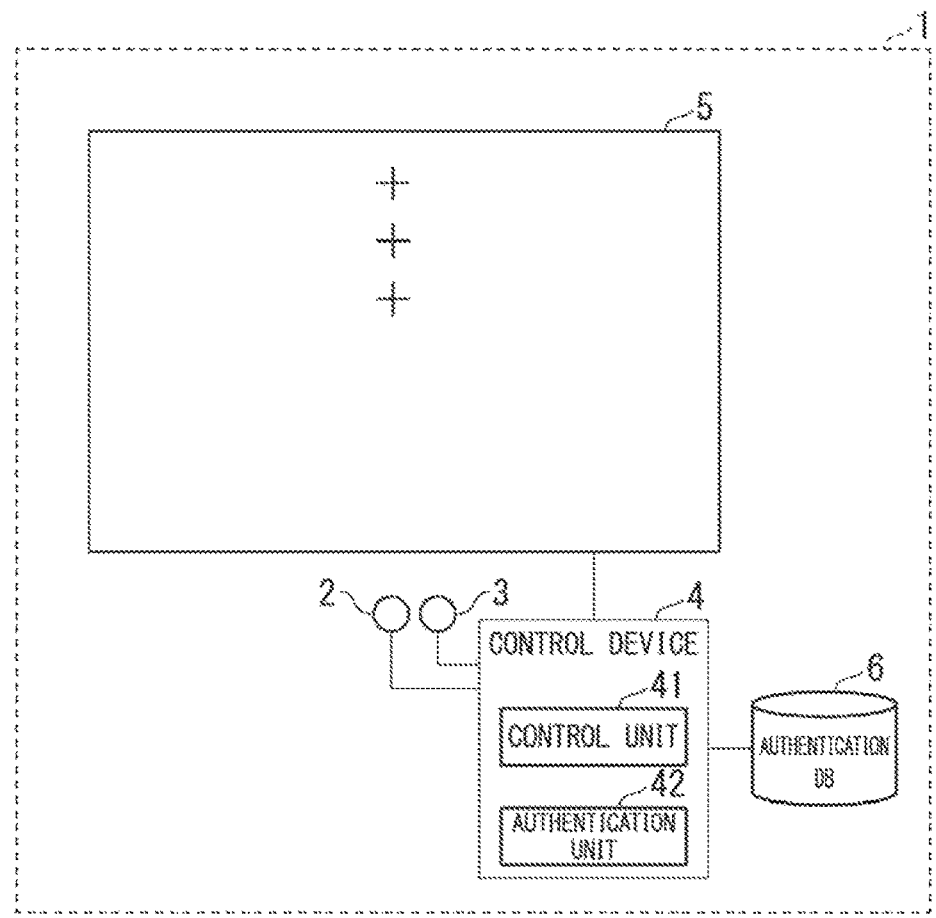
FIG. 1 is a diagram showing an example of the iris authentication device according to a first example embodiment of this disclosure.

Hereinbelow, each example embodiment of this disclosure will be described in detail with reference to the drawings. The following example embodiments do not serve to limit the invention according to the claims. Also, all combinations of features described in the example embodiments may not be essential to the solution means of the invention. In the drawings used in the following description, the description of the configuration of parts not related to this disclosure may be omitted and not shown.

First Example Embodiment (Constitution)

FIG. 1 is a diagram showing an example of the iris authentication device according to the first example embodiment of this disclosure.

As shown in FIG. 1, an iris authentication device 1 includes a camera 2, lighting 3, a control device 4, a display device 5, and an authentication DB (database) 6. The control device 4 is connected to the authentication DB 6 that stores an iris image of a registered user. The camera 2 is a camera for taking an iris image, and takes a still image or a moving image. The lighting 3 irradiates, for example, near-infrared light. As the camera 2 and the lighting 3, a general camera and light source used for iris authentication can be used. The control device 4 is a computer. The control device 4 includes a control unit 41 that controls the operation of the camera 2, the lighting 3, and the display device 5, and an authentication unit 42 that performs iris authentication. The display device 5 is, for example, a liquid crystal display. The display device 5 displays information (described as a target) to be watched by the authentication target person A based on the instruction of the control device 4. Three "+" marks shown in FIG. 1 are examples of the target. The target is displayed at a position where the angle formed by the line of sight direction of the authentication target person A and the direction of the camera 2 (θ in FIGS. 2 to 4) forms a predetermined angle. In this example, the target is displayed at a plurality of heights so that the authentication target person A can select an appropriate target according to his/her height.

Figure 2:
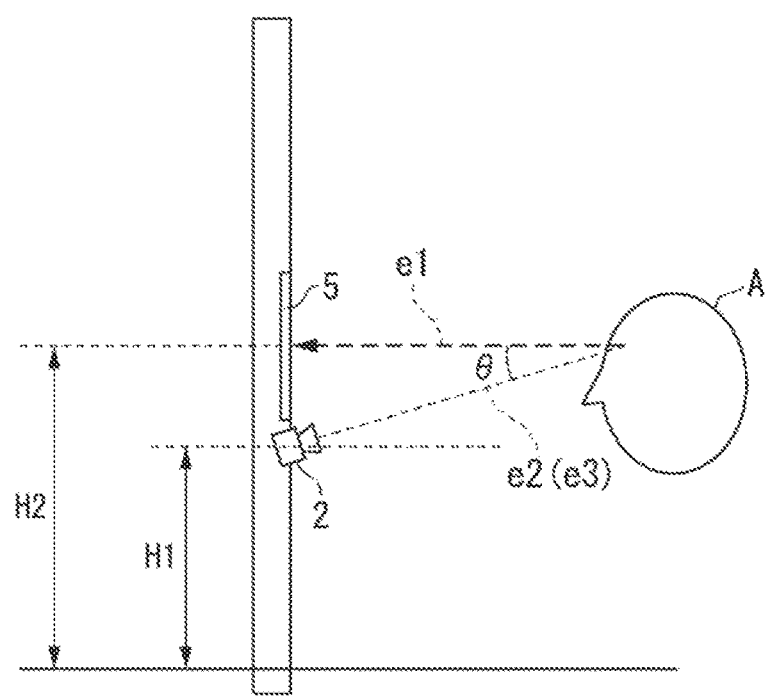
FIG. 2 is a first diagram illustrating the imaging angle according to the first example embodiment of this disclosure.
Figure 3:
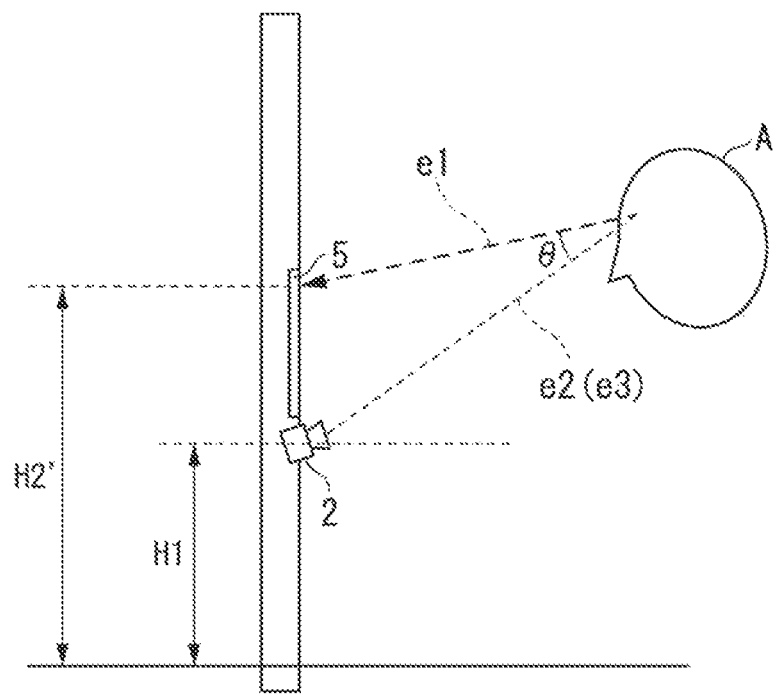
FIG. 3 is a second diagram illustrating the imaging angle according to the first example embodiment of this disclosure.
Figure 4:
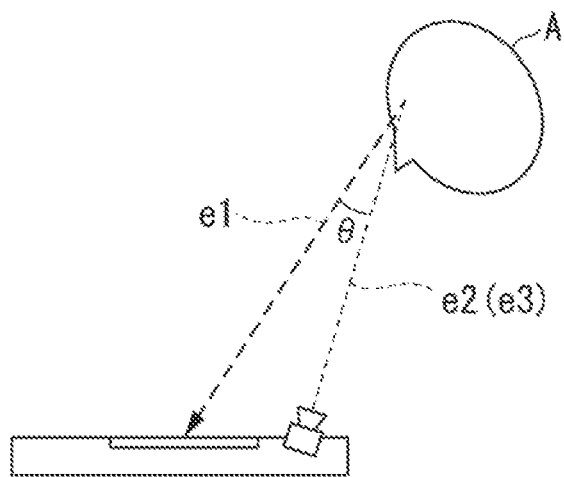
FIG. 4 is a third diagram illustrating the imaging angle according to the first example embodiment of this disclosure.

FIGS. 2 to 4 are first to third diagrams for explaining the imaging angle according to the first example embodiment of this disclosure, respectively.

The display device 5 is installed so as to be able to display a target at a position such that an angle in the vertical direction (hereinbelow called the imaging angle) formed by the line of sight e1 of the authentication target person A and the line e2 (hereinafter referred to as the reference line e2) connecting the center of the lens of the camera 2 and the eyes of the authentication target person A becomes a predetermined ideal angle θ. In FIG. 2, the height H2 of the line of sight of the authentication target person A and the center of the display device 5 are shown to be at the same height, but this is not the only allowable case. In the present example embodiment, ideally, the iris of the authentication target person A should be imaged when the face orientation of the authentication target person A and the direction of the line of sight e1 are substantially the same (the line of sight e1 may be slightly upward with respect to the face orientation as described later), and are in the positional relationship such that the imaging angle formed by the line of sight e1 and the reference line e2 becomes θ. Therefore, the camera 2 is installed in front of or slightly below the face orientation of the authentication target person A. The lighting 3 is also installed in front of or slightly below the face orientation of the authentication target person A. For example, as in the example of FIG. 1, when the display device 5 is installed on a vertical surface such as a wall, assuming the height H2 of the line of sight of the authentication target person A as a reference, the camera 2 is installed at a position (H1) lower than the height H2 of the line of sight so that the angle of the line of sight e1 and the reference line e2 when the authentication target person A naturally looks at the front is θ.

In order to capture a high-quality iris image, it is preferable that the direction of the line of sight e1 of the authentication target person A and the face orientation of the authentication target person A generally match. In order to realize this, the authentication target person A may be instructed not only to direct his/her gaze at the target but also to turn his/her face orientation toward the target. Hereinbelow, the description will be given assuming that the face orientation of the authentication target person A and the line of sight e1 are almost the same.

As illustrated in FIG. 2, the camera 2 captures the iris image of the authentication target person A from the lower front. As shown in FIG. 1, the lighting 3 is installed at the same height as the camera 2. For example, the lighting 3 is also installed so that the angle in the vertical direction formed by the line e3 connecting the center of the surface irradiating the light of the lighting 3 and the eyes of the authentication target person A and the line of sight e1 of the authentication target person A becomes the angle θ, which is the same as the imaging angle θ. The camera 2 is installed at a position where the imaging angle θ becomes an angle between 1 degree and 20 degrees (more preferably 5 degrees and 15 degrees). As the value of the imaging angle θ, an angle at which the iris of the authentication target person A can be appropriately imaged (the iris area to be imaged becomes sufficiently large) is adopted. For example, when the distance from the camera 2 to the iris is 50 cm and the direction of the line of sight e1 is the horizontal direction, the positions of the camera 2 and the lighting 3 should be arranged about 10 cm below the eyes of the authentication target person A. Regarding the horizontal arrangement, the interval between the camera 2 and the lighting 3 is preferably a distance close enough such that the red-eye phenomenon does not occur (for example, 10 cm), with the center of the camera 2 preferably being on the center line of the display device 5.

If the camera 2 is installed above the line of sight height H2 to image the authentication target person A, the eyelashes and eyelids may be obtrusive, leading to an increased possibility of not being able to capture an iris image in which the iris area required for authentication is sufficiently secured. Therefore, in the present example embodiment, the camera 2 and the lighting 3 are installed at a position lower than the line of sight height H2, so that they are positioned such that the iris image can be captured without being affected by the eyelashes and eyelids. Further, it is arranged such that the imaging angle θ is set so as to be an angle within the above-mentioned appropriate range. Further, as will be described later, in the present example embodiment, in addition to installing the camera 2 and the lighting 3 below the line of sight of the authentication target person A, by guiding the line of sight of the authentication target person A so that the imaging angle becomes θ and causing the eyes to be opened wide, many iris areas can be made to appear in the iris image. For example, when instructed to look upwards when taking an iris image, people tend to move only their pupils upward while keeping their faces fixed. Doing so produces a state of the eyes being wide open. If an iris image is taken during this period, a good quality iris image can be collected. In fact, even in the applicants' research, it is confirmed that a high-quality iris image can be captured by arranging the camera 2 and the lighting 3 below the line of sight and performing the image capture with the imaging angle set to θ while guiding the line of sight upward.

FIG. 3 shows the angle θ when performing iris authentication for an authentication target person A who is taller than the standard. In this case, the target is displayed at the height H2' where the imaging angle is θ, to guide the line of sight e1 of the authentication target person A.

FIG. 4 shows an example of the relationship between the line of sight e1 and the installation position of the camera 2 when the display device 5 is installed on a horizontal surface. In this case as well, by installing the camera 2 and the lighting 3 on the near side of the authentication target person A and displaying the target at an appropriate position on the display device 5, the line of sight e1 of the authentication target person A is guided so that the imaging angle becomes θ.

It should be noted that FIGS. 1 to 3 show the installation positions of the camera 2 and the lighting 3 for the authentication target person A of a certain height. However, since the heights of people vary, a configuration may be devised that (a) for example, installs the camera 2 and the lighting 3 on a support base with a mechanism that can be raised and lowered using a ball screw or the like so as to be able to adjust the arrangement of the camera 2 and the lighting 3 to an appropriate height with respect to the height of the eyes of the authentication target person A of any height. Alternatively, (b) a configuration may be devised that provides in the height direction a plurality of units, each including the camera 2 and the lighting 3 as one set installed at the same height. Then, a height range is displayed in the display device 5 and the authentication target person A is made to select the height, or the authentication target person A is made to input their height. In the case of the configuration (a), the control unit 41 may raise or lower the height of the camera 2 and the like according to the height that is input, while in the case of configuration (b), the control unit 41 may select a unit with a height suitable for the height of the person and operate the camera 2 and the lighting 3 of that unit. Alternatively, the height of the authentication target person A may be registered in advance in the authentication DB 6 in association with the account of the authentication target person A. The control unit 41 may refer to the authentication DB 6 on the basis of the account information entered at the time of iris authentication to acquire the height of the authentication target person A. Depending on the height, the height of the camera 2 may be raised or lowered (configuration (a)), or a unit having an appropriate height may be selected (configuration (b)).

The camera 2 may also be supported by a tilt mechanism, so that the orientation of the camera 2 may be adjusted according to the line of sight of the authentication target person A in accordance with the instruction of the control unit 41.

Alternatively, a display designating a standing position according to the height of the authentication target person A may be performed in the display device 5, to guide the standing position of the authentication target person A (distance from the display device 5) so that the imaging angle θ when the target is gazed at becomes the appropriate angle θ.

(Operation)

Next, the operation of the iris authentication device 1 will be described with reference to FIG. 5.

FIG. 5 is a flowchart showing an example of the authentication process according to the first example embodiment of this disclosure.

For example, the iris authentication device 1 is installed at a store cashier, an ATM (automated teller machine) of a financial institution, or the like, with the account information of the authentication target person A being input to the control device 4. When the authentication target person A performs an operation instructing the start of authentication, the control device 4 detects that operation and starts iris authentication (S10). First, the control unit 41 displays the target on the display device 5 (S20). For example, the control unit 41 causes the display device 5 to display the target at a position where the imaging angle becomes θ, together with information for guiding the person to gaze at the target. At this time, it is preferable to not only orient the line of sight but also guide the face orientation toward the target. The control unit 41 may display the target on the display device 5 while performing similar guidance by voice through a speaker (not shown).

Display Example 1

The display device 5 displays, for example, targets as illustrated in FIG. 1. According to the height (eye height) of the authentication target person A, it is registered in advance which target should be gazed at so that the imaging angle becomes θ, and so guidance is given such as, "For people with a height of X1 or more, please look at the top target. For people with a height of X2 to X1, please look at the second target from the top". Alternatively, the control unit 41 may move the target with the "+" mark to the left or right or further upward to guide the line of sight of the authentication target person A to move.

Display Example 2

In a situation where the authentication target person A touches a certain position on the display device 5 with his/her fingertip, it is considered that the line of sight of the authentication target person A becomes the point of touch with a high probability. Taking advantage of this property, the control unit 41 may urge them to touch a target displayed on the display device 5 with a finger by means of a display on the display device 5 or guidance by voice. As a result, the authentication target person A can be made to gaze at the target. For example, when the surface of the display device 5 is composed of a touch panel, the control device 4 can detect that the authentication target person A has touched the display device 5. The control unit 41 displays the target at a position where the imaging angle formed by the line of sight e1 and the reference line e2 is θ, and causes the display device 5 to display information for guiding the authentication target person A to touch that target. The control unit 41 instructs the camera 2 to take a picture at the timing when the touch is detected. Then, the iris image at the moment when the line of sight of the authentication target person A is directed to a preferred location can be captured.

Display Example 3

The display device 5 may display an arbitrary character string ("1234" in the example of FIG. 6) as illustrated in FIG. 6 and have the authentication target person A input the character string. The authentication target person A then inputs "1234" using an input device such as a keyboard (not shown) connected to the control device 4. The display device 5 displays the characters that have been input in at least one of the input areas 51 to 53 (for example, the input area 52). The input areas 51 to 53 are displayed at positions (heights) where the imaging angle becomes θ. The input area 51 is displayed on the left side of the display device 5 when viewed from the authentication target person A. The input area 52 is displayed in the center of the display device 5. The input area 53 is displayed on the right side when viewed from the authentication target person A. FIG. 6 shows the display state when the first "1" is input. The reason for prompting the input of a character string is that when the authentication target person A inputs a character, there is a high probability of the person looking at the input character after the input, and so if the camera 2 can capture an iris image at that moment, an appropriate iris image can be obtained. In the case of this example, the input areas 51 to 53 are the targets.

Display Example 4

The character string may be input using a software keyboard displayed on the display device 5. For example, the display device 5 displays the software keyboard in the areas 54 to 56 together with the input areas 51 to 53. The areas 54, 55, and 56 are respectively displayed on the left side, the center, and the right side of the display device 5 when viewed from the authentication target person A. While the authentication target person A inputs characters with the software keyboard, the line of sight of the authentication target person A goes toward the software keyboard, the input area 52, and the like. If the software keyboard or the input area 52 or the like is displayed at a position where the imaging angle becomes θ, and an iris image can be taken with the camera 2 while the authentication target person A performs the operation, an appropriate iris image can be taken. Although the three input areas 51 to 53 are shown in FIG. 6, the display device 5 may display one of them (for example, the central input area 52). When performing input with the software keyboard, if the software keyboard of the input area 52 and the area 55 are displayed, there is a possibility that the user's arm extended forward for character input will overlap with the line of sight of the camera 2 so that the iris cannot be imaged. In order to prevent such a situation, for example, the information of the dominant hand of the person is registered in the authentication DB 6 in association with the account information, and the control unit 41 acquires the information of the dominant hand associated with the account information of the authentication target person A when displaying the target, and if the authentication target person A is right-handed, instructs the display device 5 to display the software keyboard in the area 56 together with the input area 52. If the authentication target person A is left-handed, the control unit 41 instructs the display device 5 to display the software keyboard in the area 54 together with the input area 52. The position of the input area may be switched and displayed according to the dominant hand such that, for example, if the authentication target person A is left-handed, the input area 51 is displayed, and if the authentication target person A is right-handed, the input area 53 is displayed. By displaying the input areas 51 to 53 and the like according to the dominant hand in this way, it is possible to prevent the field of view of the camera 2 facing the eyes of the authentication target person A from being obstructed by the person's dominant hand. In the case of this example, the input areas 51 to 53 and the areas 54 to 56 serve as the targets.

This also applies to the case when requesting touch of a target shown in display example 2. For example, if the authentication target person A is right-handed, the control unit 41 instructs the display device 5 to display the target in an area on the right side (near the input area 53). This makes it possible to prevent the field of view of the camera 2 from being obstructed by the arm touching the target.

Display Example 5

Figure 7:
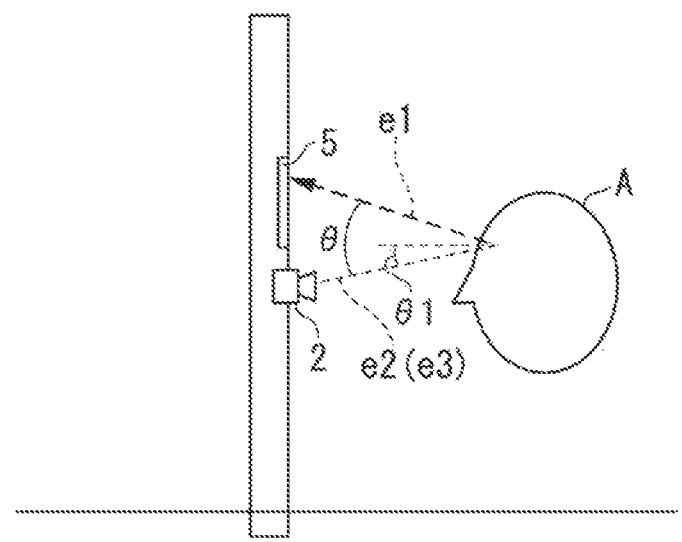
FIG. 7 is a fourth diagram illustrating the imaging angle according to the first example embodiment of this disclosure.

A psychological effect may be utilized to guide the line of sight of the authentication target person A upward, and to widely open the eyes. For example, the control unit 41 performs a display on the display device 5 so as to remind the authentication target person A of something in the past or to imagine something that has never been seen before. When in this state of mind, people tend to look upwards. For example, in the case of the camera 2 being provided at a higher position than that illustrated in FIG. 2 as illustrated in FIG. 7, when the authentication target person A naturally looks frontward, the imaging angle θ1 becomes a value smaller than the ideal θ. In such a case, for example, a question that makes one reminisce about the past is displayed on the display device 5. If an iris image is captured while the authentication target person A sees this question and turns his/her gaze upward, an iris image can be captured in which much of the iris appears.

While the control unit 41 may perform a display that guides the line of sight of the authentication target person A, the control unit 41 may also capture an iris image by utilizing a scene in which a similar psychological effect occurs in the authentication target person A. For example, when the authentication target person A operates an ATM, (1) a scene of inputting a personal identification number, (2) a scene of inputting one's own account number, (3) a scene of inputting a monetary amount, and (4) a scene of inputting a transfer destination are likely to occur, and in these scenes the aforementioned psychological effect may occur in the authentication target person A. Therefore, in these scenes, that is, when the control unit 41 displays in the display device 5 a screen prompting the authentication target person A to input a personal identification number, an account number, and the like, the control unit 41 may instruct the camera 2 to take a picture to capture an iris image. If there is no situation that causes one to recall something like (1) to (4) in a procedure that requires iris authentication, the control unit 41 may perform the display of content that makes one recall something that, while related to the current procedure, is directly meaningless to the procedure. For example, the control unit 41 may display the question "What was the last transaction date?" and answer choices such as "1: 1 to 3 months ago, 2: 3 or more months ago, 3: I don't know", or display the question "What date did you open your account?" and answer choices such as "1: 3 years or less, 2: 3 or more years ago" to encourage a choice from these options, and in the meantime capture an iris image.

Display Example 6

People tend to open their eyes wide when they see something they care about or an attractive object. Utilizing this property, the control unit 41 may display an image of a celebrity such as a talent or an image related to a matter that has become a hot topic in the world at a position where the imaging angle of the display device 5 is θ to thereby create a situation in which the eyes of the authentication target person A are wide open and capture an iris image at that moment. Further, when the target operated by the authentication target person A is an ATM, the control unit 41 may perform a display so that the image character of the financial institution guides the next step of the transaction on the ATM screen (display device 5) to thereby get the attention of the authentication target person A and capture an iris image being taken in the meantime.

Regarding the height at which the target is displayed on the display device 5, for example, the height of the authentication target person A is registered in the authentication DB 6 in association with the account information, and the control unit 41 may perform control so as to display the target at a position where the imaging angle is θ on the basis of the registered height.

When the target is displayed on the display device 5 and the state of the eyes of the authentication target person A is adjusted, then (or at the same time as displaying the target), the control unit 41 turns on the lighting 3 and gives a shooting instruction to the camera 2. Then, the lighting 3 is turned on, and during that time, the camera 2 captures one or a plurality of iris images (S30). Next, the control unit 41 turns off the lighting 3 and instructs the camera 2 to stop shooting. The control unit 41 acquires the iris image taken by the camera 2 and outputs the iris image to the authentication unit 42. The authentication unit 42 extracts the iris region from the acquired iris image. The authentication unit 42 accesses the authentication DB 6 and acquires an image associated with the account information of the authentication target person A from the images for authentication registered in advance. The authentication unit 42 collates the image acquired from the authentication DB 6 with the image cut out from the iris image captured this time by the camera 2 and performs authentication (S40). When the degree of similarity between the two images is higher than a predetermined threshold value, the authentication unit 42 determines that the authentication is successful. If the iris image is not of good quality or the authentication is not successful, the processing from S20 onward may be repeated a predetermined number of times. The authentication unit 42 outputs the authentication result to another device (register terminal or ATM terminal). If the authentication is successful, for example, payment processing by a payment system or deposit/withdrawal processing at the ATM is performed.

According to the present example embodiment, the camera 2 and the lighting 3 are provided at a position lower than the line of sight of the authentication target person A, and since the line of sight of the authentication target person A is guided so that the imaging angle becomes θ to capture an iris image, it is possible to quickly and surely acquire a high-quality iris image suitable for iris authentication. For example, for a distance of 50 cm from the camera 2 to the iris, the positions of the camera 2 and the lighting 3 are ideally arranged about 10 cm below. This arrangement can be realized, for example, by arranging the camera 2 and the lighting 3 below the target at which the authentication target person orients his/her line of sight, such as the display device 5. This makes it possible to prevent the iris from entering the shadow of the eyelids and eyelashes, which deteriorates the image quality of the iris image.

By performing the display in the display device 5 so as to guide the line of sight of the authentication target person A upward or induce the person to open their eyes wide, the iris area of the authentication target person A can be exposed more effectively, and by capturing an image with the camera 2 at the timing of performing the guidance display, a high-quality iris image can be captured.

The illumination of the display device 5 may be used instead of the lighting without providing the lighting 3. In the case of this configuration, the control unit 41 performs control so that the lower part of the display device 5, which is a portion close to the ideal lighting position, becomes bright at the timing of displaying the target or the like.

The control unit 41 may operate the camera 2 by giving notice of the timing of taking the iris image by a countdown or the like, and after giving notice of performing the iris image capture, may urge the authentication target person A to gaze at the target or input text and perform the capture of the iris image at an arbitrary timing during the lapse of a predetermined time from the notification (for example, during the procedure, until shortly before the result of the iris authentication is required).

Further, depending on the dominant hand, for example, if the authentication unit 42 determines that the image taken by displaying the software keyboard in the region 54 is not a high-quality iris image, since the dominant hand may be different from what was assumed, the software keyboard may be displayed in the region 56, with a prompt given to input a character string into the input area 52 or the like, and the iris image may be taken again.

Regardless of the dominant hand of the authentication target person A, for example, when the authentication unit 42 determines that the image taken while the character string is input to the input area 52 is not a high-quality iris image, the control unit 41 may perform control to next prompt the input of a character string in the input area 51 (or the input area 53) and recapture the iris image when the line of sight is moved in a different direction. Similarly, in the case of display example 1 and display example 2, when the authentication unit 42 determines that the iris image taken in the situation where the target is displayed at a certain position is not a good quality iris image, the control unit 41 may display the target at another position and retake the iris image.

When the camera 2 shoots a moving image instead of a still image, the authentication unit 42 may select a high-quality iris image (for example, a frame containing a large amount of the iris region) from the frames constituting the moving image, and perform iris authentication using the iris appearing in that frame.

Second Example Embodiment (Constitution)

Figure 8:
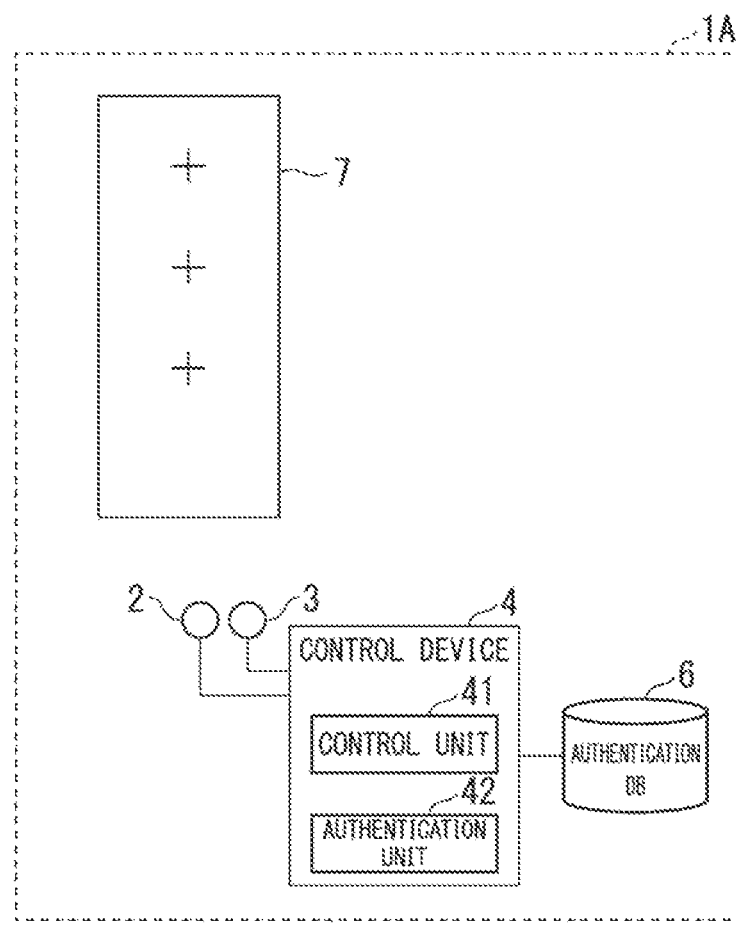
FIG. 8 is a diagram showing an example of the iris authentication device according to a second example embodiment of this disclosure.

FIG. 8 is a diagram showing an example of an iris authentication device according to a second example embodiment of this disclosure.

As shown in FIG. 8, the iris authentication device 1A includes the camera 2, the lighting 3, the control device 4, the panel 7 on which a target is marked, and the authentication DB 6. The iris authentication device 1A of the second example embodiment does not have the display device 5. In the second example embodiment, the panel 7 on which the target is marked is used instead of the display device 5. The panel 7 is installed above the camera 2 and the lighting 3. On the panel 7, a plurality of targets corresponding to the height H2 of the line of sight of the authentication target person A may be marked.

(Operation)

The operation of the iris authentication device 1A of the second example embodiment will be described with reference to FIG. 5. In the second example embodiment, the processing of S20 is not performed.

The authentication target person A is notified in advance to gaze at the target according to the height of his/her line of sight marked on the panel 7 (the target at which the imaging angle becomes θ) after the authentication start action. The account of the authentication target person A is input to the control device 4. In this state, the authentication target person A performs an operation instructing the control device 4 to start authentication. The control device 4 detects the operation and starts iris authentication (S10). The control unit 41 turns on the lighting 3 and gives an imaging instruction to the camera 2. The lighting 3 is turned on for a predetermined time, during which the camera 2 captures an iris image (S30). The control unit 41 compares the iris image taken by the camera 2 with the authentication image associated with the account of the authentication target person A stored in the authentication DB 6 and performs authentication (S40).

According to the present example embodiment, the camera 2 and the lighting 3 are provided at a position lower than the line of sight of the authentication target person A, and the line of sight of the authentication target person A is directed at a position where the imaging angle becomes θ by the target marked on the panel 7. This makes it possible to easily acquire a high-quality iris image of the authentication target person A in a short time.

Third Example Embodiment (Constitution)

Figure 9:
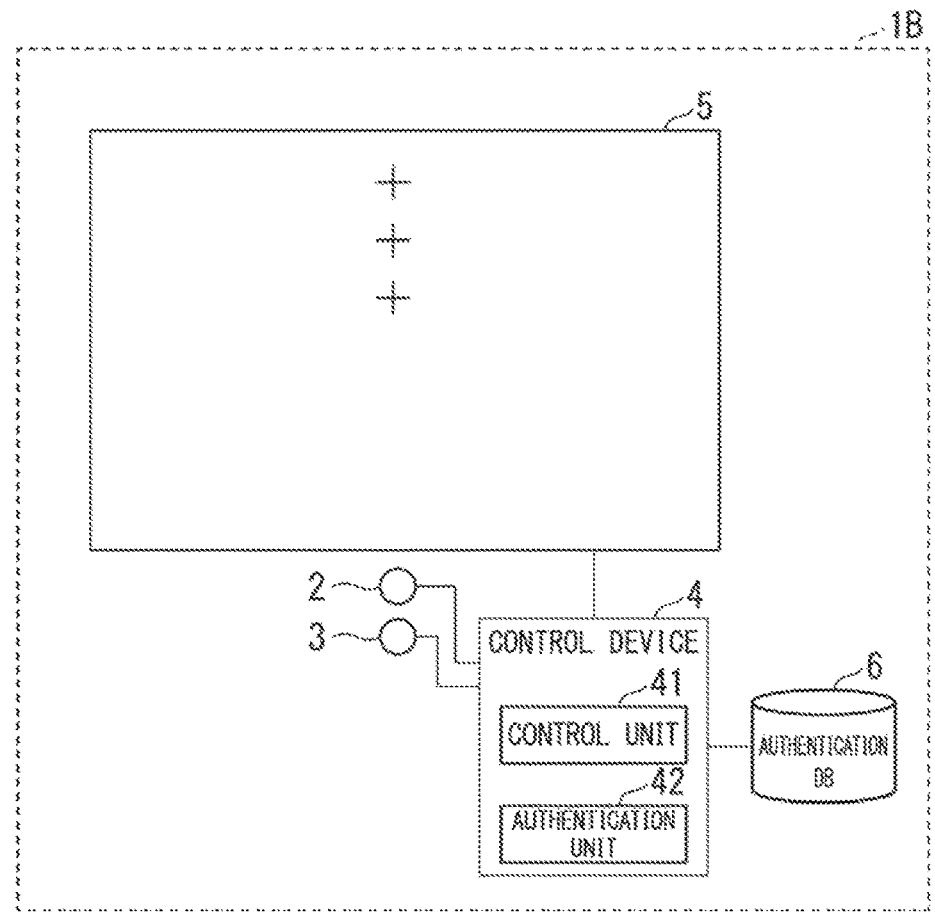
FIG. 9 is a diagram showing an example of the iris authentication device according to a third example embodiment of this disclosure.

FIG. 9 is a diagram showing an example of an iris authentication device according to a third example embodiment of this disclosure.

As shown in FIG. 9, the iris authentication device 1B includes the camera 2, the lighting 3, the control device 4, the display device 5, and the authentication DB 6. Each constitution is the same as in the first example embodiment. Unlike the first example embodiment, in the iris authentication device 1B of the third example embodiment, the lighting 3 is installed further below the camera 2 as illustrated in FIG. 9.

Figure 10:
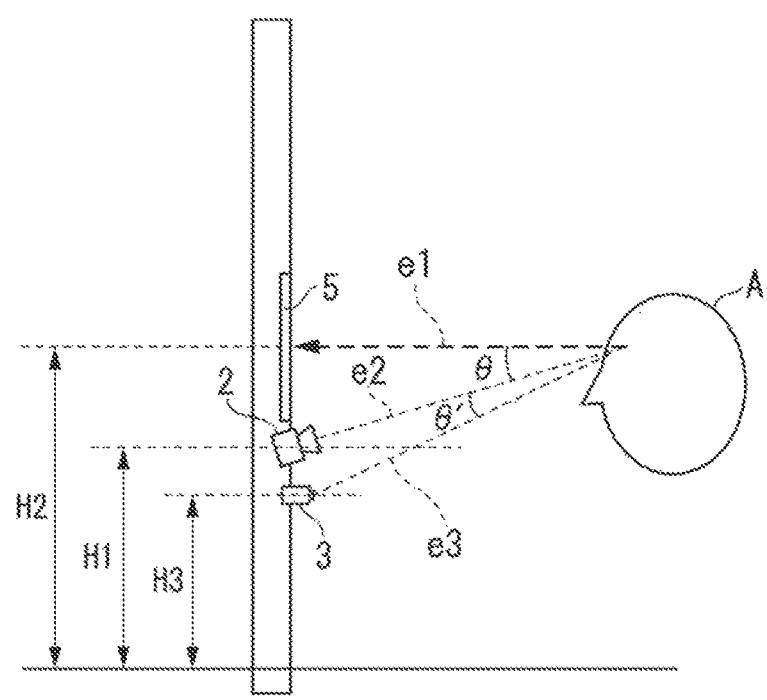
FIG. 10 is a diagram illustrating an imaging angle and an illumination angle according to a third example embodiment of this disclosure.

FIG. 10 is a diagram illustrating the imaging angle and illumination angle according to the third example embodiment of this disclosure.

As illustrated in FIG. 10, the lighting 3 is installed at a height such that the illumination angle formed by the line of sight e1 of the authentication target person A and the line e3 connecting the center of the irradiation surface of the lighting 3 and the eyes of the authentication target person A becomes θ+θ'. Here, θ is the above-mentioned ideal imaging angle (for example, 1 degree to 20 degrees), and A' is a value between 1 degree and 15 degrees (more preferably 5 degrees to 10 degrees). For the value of θ', an angle from which the iris of the authentication target person A can be appropriately imaged is adopted from the above range. For example, when the distance from the display device 5 to the iris is 50 cm, it is preferable that the height H3 of the installation position of the lighting 3 is installed so as to be about 5 cm to 10 cm lower than the height H1 of the installation position of the camera 2. Regarding the arrangement in the horizontal direction, the positions of the camera 2 and the lighting 3 in the horizontal direction are aligned with each other as seen from the person A to be authenticated, and the camera 2 and the lighting 3 are arranged to be aligned on the center line of the display device 5 (FIG. 9).

By adopting such an arrangement and taking an iris image when the imaging angle is θ, it has been confirmed by the applicant that a better iris image can be taken than in the case of capturing an image with the arrangement of the camera 2 and the lighting 3 exemplified in the first example embodiment.

(Operation)

The operation of the iris authentication device 1B of the third example embodiment is the same as that of the first example embodiment, and thus the description thereof will be omitted.

According to this example embodiment, the same effect as that of the first example embodiment can be obtained with a higher probability.

Fourth Example Embodiment (Constitution)

Next, a fourth example embodiment will be described with reference to FIGS. 11 and 12. The fourth example embodiment can be combined with any of the configurations of the first example embodiment to the third example embodiment, and a case where the fourth example embodiment is combined with the first example embodiment will be described.

Figure 11:
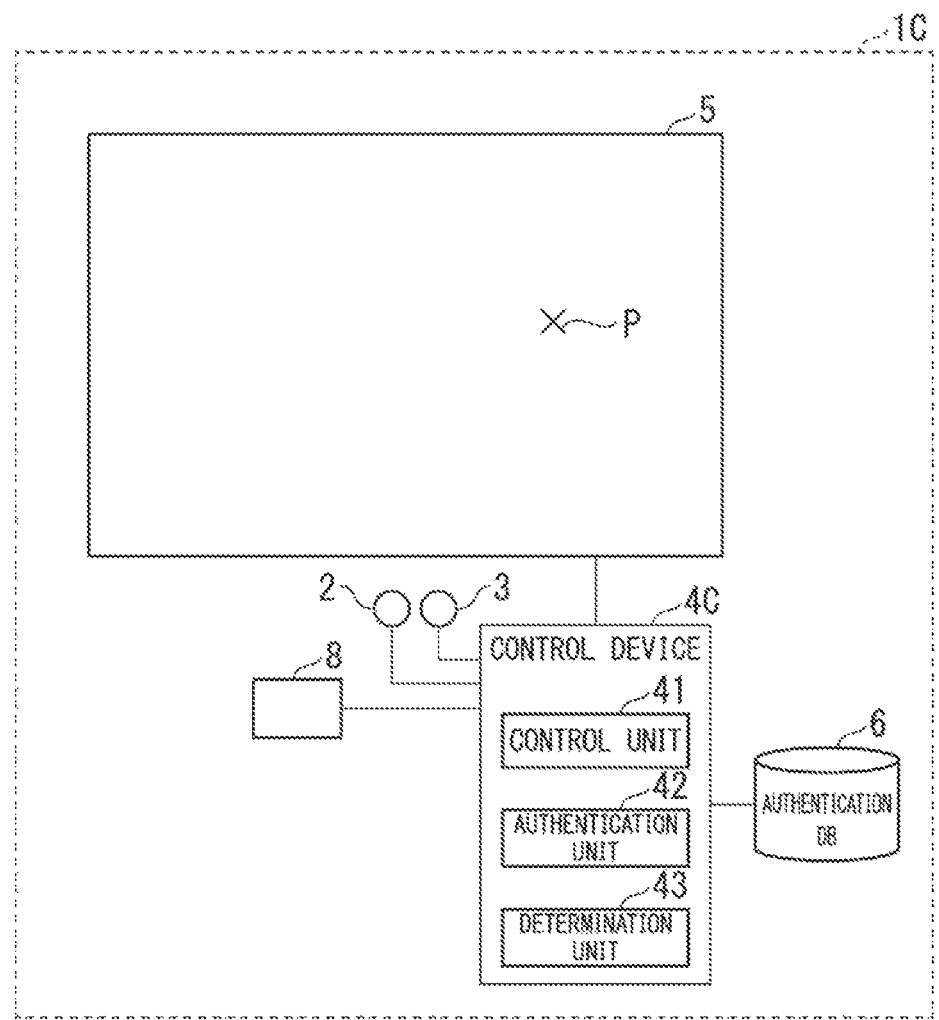
FIG. 11 is a diagram showing an example of an iris authentication device according to a fourth example embodiment of this disclosure.

FIG. 11 is a diagram showing an example of an iris authentication device according to the fourth example embodiment of this disclosure.

As shown in FIG. 11, the iris authentication device 1C includes the camera 2, the lighting 3, a control device 4C, the display device 5, a line of sight detection device 8, and the authentication DB 6. In addition to the configuration of the first example embodiment, the iris authentication device 1C has the line of sight detection device 8 that is generally provided. For example, the line of sight detection device 8 has a camera that captures an image of the authentication target person A and a camera that images the field of view of the authentication target person A, analyzes the direction of the line of sight of the authentication target person A, and outputs information of the line of sight position of the authentication target person A on the display device 5 that changes from moment to moment (for example, the "X" mark P shown in FIG. 11). The control device 4C includes a determination unit 43 in addition to the control unit 41 and the authentication unit 42. The determination unit 43 determines whether or not the line of sight of the authentication target person A is a position suitable for capturing an iris image, based on the line of sight position information output from the line of sight detection device 8. For example, the authentication DB 6 stores information on the height of the user and the height of the line of sight suitable for acquiring an iris image in association with the account information. The determination unit 43 compares the height indicated by the information of the line of sight position output from the line of sight detection device 8 with the information of the ideal line of sight height registered in the authentication DB 6, and determines the line of sight position of the authentication target person A detected by the line of sight detection device 8 to be a line of sight position suitable for taking an iris image if within the permissible range based on the ideal line of sight height registered in the authentication DB 6.

For example, when the line of sight detection device 8 recognizes the face orientation and the line of sight direction from the image of the face of the authentication target person A, the determination unit 43 acquires the line of sight direction information from the line of sight detection device 8 and calculates the imaging angle from the line of sight direction information. Then, when the imaging angle becomes θ, the determination unit 43 determines the line of sight position to be one suitable for capturing the iris image.

(Operation)

Next, the operation of the fourth example embodiment will be described with reference to FIG. 12.

Figure 12:
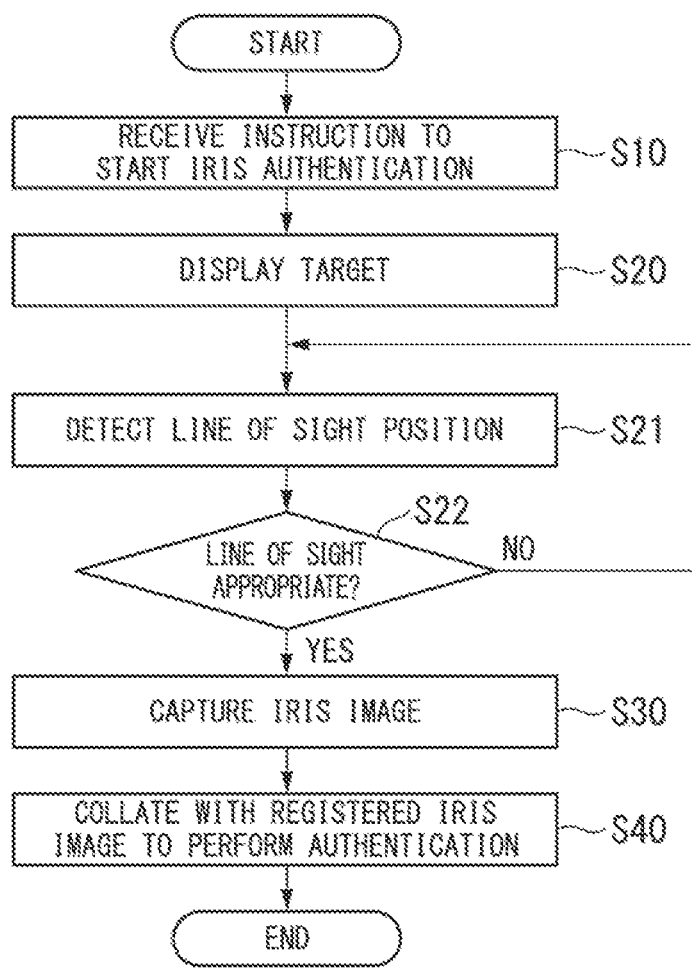
FIG. 12 is a flowchart showing an example of an authentication process according to the fourth example embodiment of this disclosure.

FIG. 12 is a flow chart showing an example of the authentication process according to the fourth example embodiment of this disclosure.

The same content as the first example embodiment will be briefly explained. When the authentication target person A performs an operation instructing the start of authentication, the control device starts iris authentication (S10). The control unit 41 displays a target or the like on the display device 5 (S20). The authentication target person A gazes at the target. The line of sight detection device 8 detects the line of sight position or the line of sight direction of the authentication target person A (S21), and outputs information of the line of sight position for each detected moment to the control device 4. In the control device 4, the determination unit 43 acquires the information of the ideal line of sight position associated with the account information input in advance from the authentication DB 6, compares the information with the line of sight information of the authentication target person A detected by the line of sight detection device 8 and determines whether or not the line of sight of the authentication target person A is appropriate (S22). Alternatively, the determination unit 43 calculates the imaging angle based on the line of sight direction, and determines whether or not the deviation between the imaging angle and θ is within the allowable range. If the line of sight of the authentication target person A is not at an appropriate height, or if the deviation between the imaging angle and θ is not within the allowable range, the processes S21 to S22 are repeated. When the line of sight of the authentication target person A becomes appropriate or the deviation between the imaging angle and θ is within the allowable range, the determination unit 43 determines that the line of sight is appropriate and outputs the determination result to that effect to the control unit 41. Then, the control unit 41 turns on the lighting 3 and gives an imaging instruction to the camera 2. The lighting 3 is turned on for a predetermined time, during which the camera 2 captures an iris image (S30). The authentication unit 42 collates the captured iris image with the authentication image associated with the account information of the authentication target person A to perform authentication (S40), and outputs the collation result to a cash register terminal or the like.

According to the present example embodiment, since the camera 2 captures an iris image when the line of sight position of the authentication target person A detected by the line of sight detection device 8 becomes a position suitable for iris authentication (a position where the imaging angle is θ), it is possible to acquire an appropriate iris image more reliably and perform authentication.

In the above description, an example was described of guiding the line of sight of the authentication target person A by displaying a target, but the line of sight of the authentication target person A may be detected by the line of sight detection device 8 without displaying the target, and imaging of the iris may be performed by the camera at the point when the determination unit 43 determines that the line of sight of the authentication target person A is appropriate.

Figure 13:
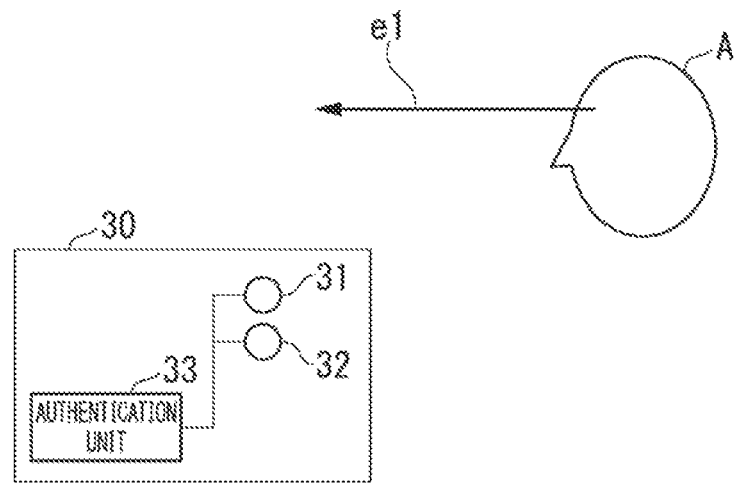
FIG. 13 is a diagram showing a minimum configuration of the iris authentication device according to this disclosure.

FIG. 13 is a diagram showing a minimum configuration of the iris authentication device according to this disclosure.

The iris authentication device 30 includes a camera 31 installed at a position lower than the line of sight e1 of the authentication target person A, lighting 32 that is installed at the same height as the camera 31 or at a position lower than the camera 31 and irradiates the authenticated person A with light, and an authentication unit 33 that performs authentication of the authentication target person A by collating the iris that appears in an image of the authentication target person A captured by the camera 31 from the front lower part while the lighting 32 is irradiating the light with a pre-registered iris image.

In the iris authentication device 30, since the camera 31 and the lighting 32 are arranged appropriately for capturing the iris image, it is possible to capture the iris image quickly without imposing a burden on the authentication target person A, and perform the iris authentication.

Figure 14:
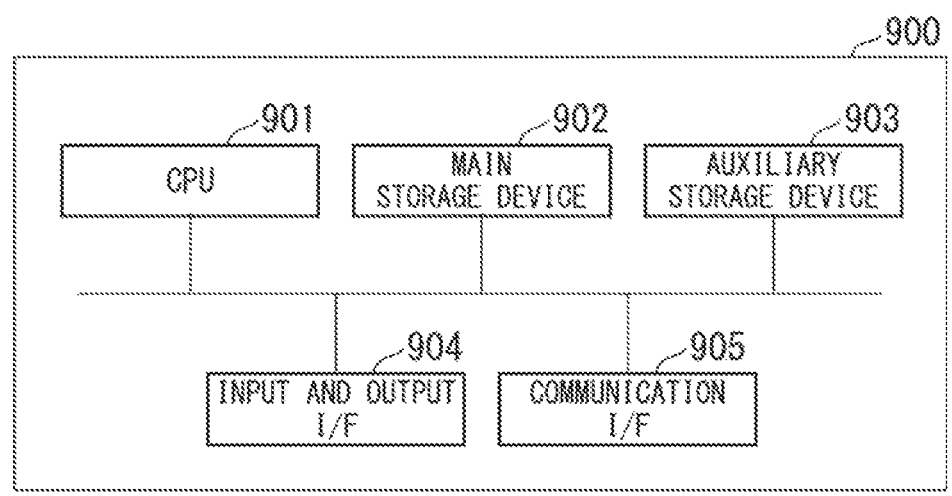
FIG. 14 is a diagram showing an example of the hardware configuration of a control device according to each example embodiment of this disclosure.

FIG. 14 is a diagram showing an example of the hardware configuration of the control device according to each example embodiment of this disclosure.

The computer 900 includes a CPU 901, a main storage device 902, an auxiliary storage device 903, an input and output interface 904, and a communication interface 905. The control devices 4 and 4C described above are mounted on the computer 900. The operation of each of the above-mentioned function units is stored in the auxiliary storage device 903 in a program format. The CPU 901 reads the program from the auxiliary storage device 903, deploys the program to the main storage device 902, and executes the above processing according to the program. The CPU 901 secures a storage area in the main storage device 902 according to the program. The CPU 901 also secures a storage area for storing the data being processed in the auxiliary storage device 903 according to the program.

Note that, in at least one example embodiment, the auxiliary storage device 903 is an example of a non-temporary tangible medium. Other examples of non-temporary tangible media include magnetic disks, magneto-optical disks, CD-ROMs, DVD-ROMs, semiconductor memories, etc. connected via the input and output interface 904. When this program is distributed to the computer 900 by a communication line, the computer 900 that has received the distribution may expand the program to the main storage device 902 and execute the above processing. Further, the program may be one for realizing some of the above-mentioned functions. In addition, the program may be a so-called differential file (differential program) that realizes the above-mentioned functions in combination with another program already stored in the auxiliary storage device 903.

In addition, it is possible to replace the constituent elements in the above-described example embodiment with well-known constituent elements as appropriate without departing from the spirit of this disclosure. Further, the technical scope of this disclosure is not limited to the above-described example embodiments, and various modifications can be made without departing from the spirit of this disclosure.

INDUSTRIAL APPLICABILITY

According to the iris authentication device and iris authentication method, it is possible to quickly capture an iris image of an authentication target person with the quality required for the authentication process and perform the iris recognition.

DESCRIPTION OF REFERENCE SYMBOLS

1, 1A, 1B, 1C, 30: Iris authentication device
2, 31: Camera
3, 32: Lighting
4, 4C: Control device
41: Control unit
42, 33: Authentication unit
43: Determination unit
5: Display device
6: Authentication DB
7: Panel
8: Line of sight detection device
A: Authentication target person
900: Computer
901: CPU
902: Main storage device
903: Auxiliary storage device
904: Input and output interface
905: Communication interface

What is claimed is:

1. An iris authentication device comprising:
a camera that is installed at a position lower than a line of sight of an authentication target person;
lighting that is installed either at a same height as the position of the camera or at a position lower than the camera and that irradiates the authentication target person with light;
a display configured to display a target to be gazed at by the authentication target person, the display comprising a touch panel configured to detect that a finger of the authentication target person touches the target;
at least one memory storing instructions; and
at least one processor configured to execute the instructions to:
perform authentication of the authentication target person by collating an iris that appears in an image of the authentication target person with a pre-registered iris image, the image of the authentication target person being captured by the camera from lower front while the lighting is irradiating the light,
wherein performing the authentication comprises:
displaying the target by the display; and
causing the camera to capture, at a timing when the touch panel of the display detects that the finger of the authentication target person touches the target, the image of the authentication target person touching the touch panel, and
wherein displaying the target comprises:
acquiring information of a dominant hand of the authentication target person; and
switching a position where the target is displayed based on the information of the dominant hand.

2. The iris authentication device according to claim 1, wherein the camera is installed so that an imaging angle formed by a line connecting a center of a lens of the camera and a position of an eye of the authentication target person and the line of sight of the authentication target person is an angle from 1 degree and 20 degrees.

3. The iris authentication device according to claim 2, wherein the lighting is installed at the position lower than the camera, and
the lighting is installed so that an illumination angle formed by a line connecting a center of an irradiation surface of the lighting and the position of the eye of the authentication target person and the line of sight of the authentication target person is 1 to 15 degrees larger than the imaging angle.

4. The iris authentication device according to claim 2, wherein the at least one processor is configured to execute the instructions to:
display the target at a position where the imaging angle when the authentication target person gazes at the target becomes a predetermined ideal angle, and turn on the lighting and cause the camera to capture the image; and
perform the authentication by using the image captured by the camera.

5. The iris authentication device according to claim 4, wherein the at least one processor is configured to execute the instructions to cause the display to display information that prompts the authentication target person to gaze at the target.

6. The iris authentication device according to claim 1, wherein the at least one processor is configured to execute the instructions to:
cause the display to display information that prompts a direction of the line of sight or a size of an eye of the authentication target person to be suitable for capturing an iris image, and turn on the lighting and cause the camera to capture an image; and
perform the authentication by using the image captured by the camera.

7. The iris authentication device according to claim 1, further comprising:
a detector that detects the line of sight of the authentication target person,
wherein the at least one processor is configured to execute the instructions to perform the authentication by using the image captured by the camera at a point of time when the detector detects that an angle formed by a line connecting a center of a lens of the camera and a position of an eye of the authentication target person and the line of sight of the authentication target person becomes a predetermined ideal angle.

8. An iris authentication method performed by using an iris authentication device comprising:
a camera that is installed at a position lower than a height of a line of sight of an authentication target person; and lighting that is installed either at a same height as the position of the camera or at a position lower than the camera and irradiates the authentication target person with light, wherein the method comprises:

performing authentication of the authentication target person by collating an iris that appears in an image of the authentication target person with a pre-registered iris image, the image of the authentication target person being captured by the camera from lower front while the lighting is irradiating the light, wherein performing the authentication comprises:

displaying, by a display, a target to be gazed at by the authentication target person;

detecting, by a touch panel of the display, that a finger of the authentication target person touches the target; and causing the camera to capture, at a timing when the touch panel of the display detects that the finger of the authentication target person touches the target, the image of the authentication target person touching the touch panel, and wherein displaying the target comprises:

acquiring information of a dominant hand of the authentication target person; and switching a position where the target is displayed based on the information of the dominant hand.

9. The iris authentication method according to claim 8, wherein the camera is installed so that an imaging angle formed by a line connecting a center of a lens of the camera and a position of an eye of the authentication target person and the line of sight of the authentication target person is an angle from 1 degree and 20 degrees.

10. The iris authentication method according to claim 9, wherein the lighting is installed at the position lower than the camera, and wherein the lighting is installed so that an illumination angle formed by a line connecting a center of an irradiation surface of the lighting and the position of the eye of the authentication target person and the line of sight of the authentication target person is 1 to 15 degrees larger than the imaging angle.

11. The iris authentication method according to claim 9, where in the target is displayed at a position where the imaging angle when the authentication target person gazes at the target becomes a predetermined ideal angle, and wherein causing the camera to capture the image comprises:

turning on the lighting and causing the camera to capture the image.

12. The iris authentication method according to claim 11, wherein performing the authentication further comprises:

displaying, by the display, information that prompts the authentication target person to gaze at the target.

13. The iris authentication method according to claim 8, wherein performing the authentication further comprises:

displaying, by the display, information that prompts a direction of the line of sight or a size of an eye of the authentication target person to be suitable for capturing an iris image, and wherein causing the camera to capture the image comprises:

turning on the lighting and causing the camera to capture the image.

14. The iris authentication method according to claim 8, further comprising:

detecting, by a detector, the line of sight of the authentication target person, and wherein the authentication is performed by using the image captured by the camera at a point of time when the detector detects that an angle formed by a line connecting a center of a lens of the camera and a position of an eye of the authentication target person and the line of sight of the authentication target person becomes a predetermined ideal angle.

* * * * *